June 1, 1926.

J. G. HEARD, JR

TOY CAMERA

Filed May 11, 1925

Inventor
Joseph G. Heard Jr.

By Moore Fenwick & Lammers
Attorneys

June 1, 1926.
J. G. HEARD, JR
TOY CAMERA
Filed May 11, 1925
1,586,678
2 Sheets-Sheet 2
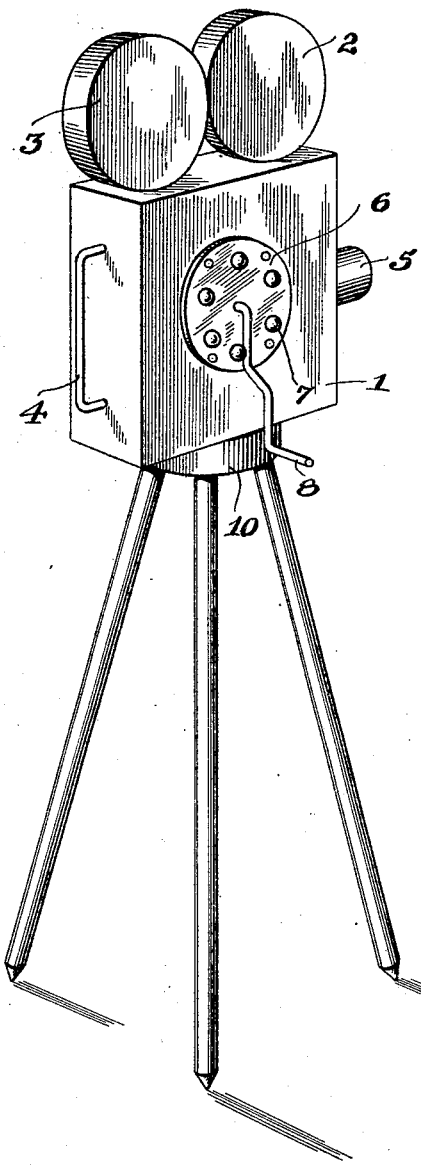
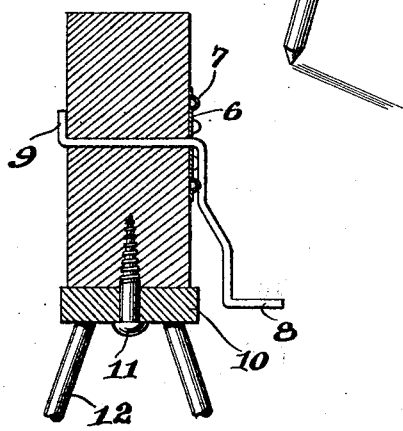
Inventor
Joseph G. Heard Jr.
By Mason Fenwick Lawrence,
Attorneys Patented June 1, 1926.

1,586,678

UNITED STATES PATENT OFFICE.

JOSEPH GARRETT HEARD, JR., OF ATLANTA, GEORGIA.

TOY CAMERA.

Application filed May 11, 1925. Serial No. 29,581.

The object of this invention is to provide a toy camera consisting of a multiplicity of parts. These parts may be made of wood or any suitable material and when assembled are adapted to represent a toy camera.

A further object of this invention is to provide a means for producing a "clicking" sound of vibration common to cameras, in such a manner that children may be amused thereby.

Other objects will appear in the following detailed description.

In the drawing:—

Figure 3:
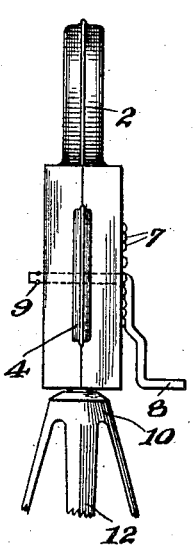

Fig. 3, designates a vertical elevation view of the rear end of the camera body showing the handle by which the camera may be guided.

Figure 4:
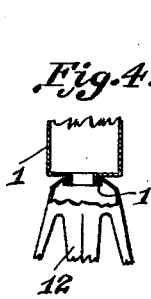

Fig. 4, illustrates a sectional elevation view of the rotatable device at the junction between the camera body and the tripod support.

Figures 5, 6:
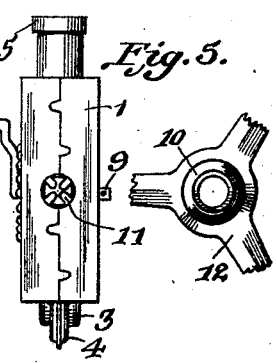

Fig. 5, illustrates the bottom plan view of the camera body showing the means for rotatably mounting camera body on the tripod support.

Fig. 6, illustrates a plan view of the intersecting or pivoting point of the tripod support of the camera.

Figure 7:
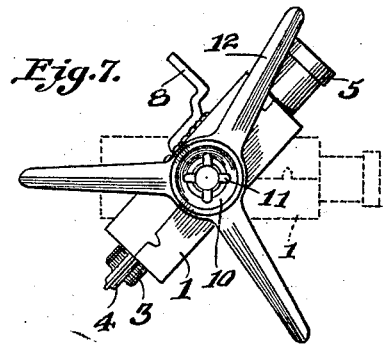

Fig. 7, illustrates a plan view of the camera mounted on the tripod showing the manner in which the tripod and camera body may be rotatably mounted and attached together.

Figure 1:
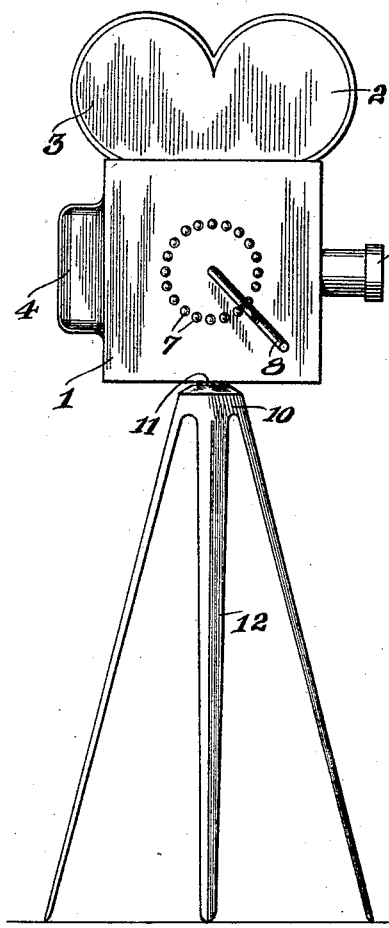
Fig. 1, illustrates a vertical side view of the toy camera as contemplated.

Fig. 8, represents an elevation view of the camera in assembled form slightly modified over the camera disclosed in Fig. 1.

Figure 2:
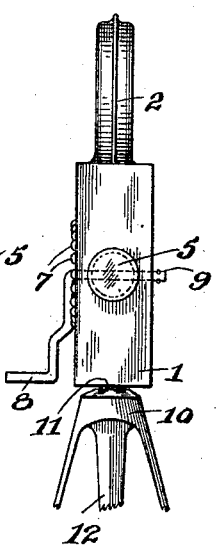
Fig. 2, represents an end elevation view of the camera body showing plan of tubular projection representing the camera lens.

Fig. 9, designates sectional view of the body portion of the camera illustrated in Fig. 8. This form of construction being merely a slight modification of the design disclosed in Figures 2 and 3.

Numeral 1, designates the main body portion of the toy camera; it may be made of a block of wood or any suitable material and has attached along its top portion two discs 2 and 3, representing reel holders, while at one end of the body a wire 4 is fastened for the purpose of guiding the camera to the desired position; on the other end a tubular projection 5 is attached, adapted to represent a camera lens. To one face of the main body portion 1 is fastened a metal disc 6, having an embossed or raised surface as at 7, for the purpose of engaging a wire crank 8 shaped to pass over the raised surface when turned thereby producing a clicking sound common to cameras, and adapted to amuse the children and others without in any manner departing from the spirit of this invention. It is understood that the raised portion 7, may be an integral part of a face 1 of the camera. The camera may or may not be entirely composed of metal. The crank 8 is formed to extend through the main body portion, and is rotatably and securely mounted therein by turning up or flattening its ends as at 9.

The main body portion 1 is rotatably mounted upon a disc or tripod 10, by means of a pivoting device in combination with tripod legs 12. Numeral 11 designates a form or means for rotatably mounting the camera body on a tripod support. This means may be of any suitable type.

In operation this invention will appeal to the imagination of children and others. It is designed to resemble the regular movie camera in general lines. On turning the crank, a clicking sound is produced which will greatly amuse young and old.

What I claim is:—

1. In a toy camera having a main body portion rotatably mounted on a tripod, a holder adapted for guiding purposes, a tubular projection for simulating a lens, and means for producing a clicking sound or vibration consisting of a raised surface on one face of the camera, and a crank adapted to produce a clicking sound as it is revolved over the raised surface.

2. In a toy camera having a main body portion rotatably mounted on a tripod, a holder adapted for guiding purposes, a tubular projection adapted for a lens, and means for producing a clicking sound or vibration consisting of a raised surface embossed on one face of the camera, and a crank adapted to produce a clicking sound as it is revolved over the raised surface, the said crank being adapted to pass through the body of the camera.

In testimony whereof I affix my signature.

JOSEPH GARRETT HEARD, JR.